United States Patent [19]

Rysdam, II

[11] 3,712,639

[45] Jan. 23, 1973

[54] EXTENSIBLE BUNK STAKE FOR LOG TRUCKS

[76] Inventor: John E. Rysdam, II, Route 1 Box 8A, Elgin, Oreg.

[22] Filed: Dec. 31, 1970

[21] Appl. No.: 103,117

[52] U.S. Cl. ............................... 280/146, 105/389
[51] Int. Cl. ..................................... B60p 7/06
[58] Field of Search..280/179 R, 143, 144, 145, 146, 280/147; 296/43; 105/379, 380, 382, 386, 387, 389

[56] References Cited

UNITED STATES PATENTS

| 586,440 | 7/1897 | Kernek et al. | 280/146 |
| 972,041 | 10/1910 | Tucker | 280/144 |
| 833,978 | 10/1906 | Sage | 296/43 X |
| 668,606 | 2/1901 | Sheehy | 105/380 |

Primary Examiner—Gerald M. Forlenza
Assistant Examiner—Frank E. Werner
Attorney—James D. Givnan, Jr.

[57] ABSTRACT

A bunk stake for the retention of logs on a logging truck and trailer with the stake having an extension normally telescopically received within the bunk state. The upper end of the extension is adapted for engagement with the log or like article being loaded for purposes of extracting the extension into a raised, locked position. Latch means are provided to retain the extension in a raised position and to permit convenient retraction by the truck operator of the extension.

3 Claims, 6 Drawing Figures

PATENTED JAN 23 1973 3,712,639
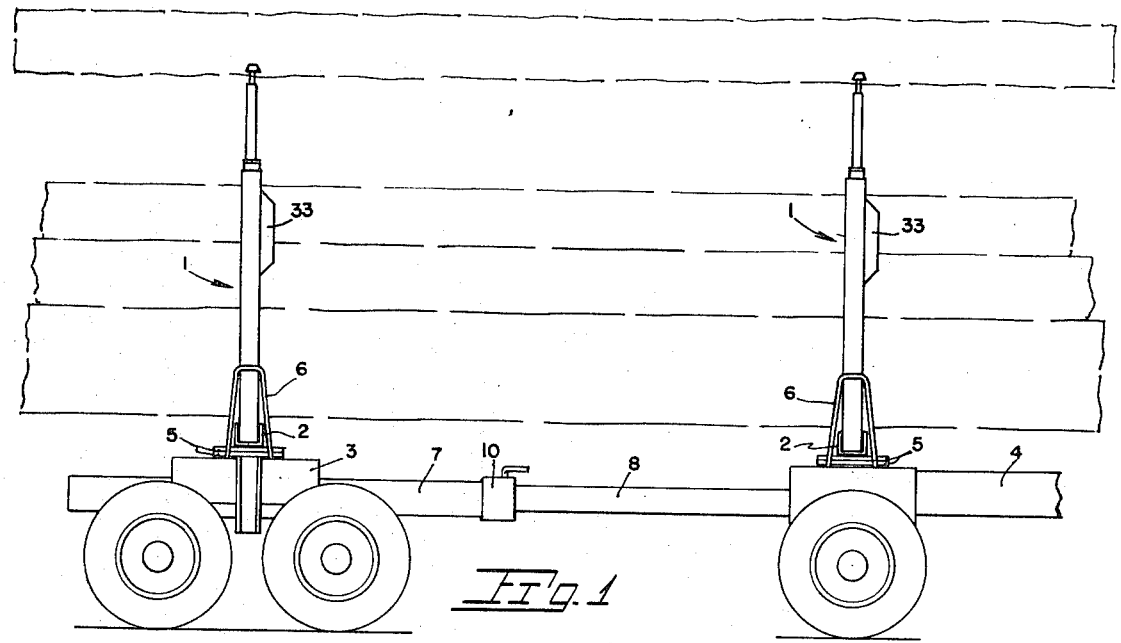
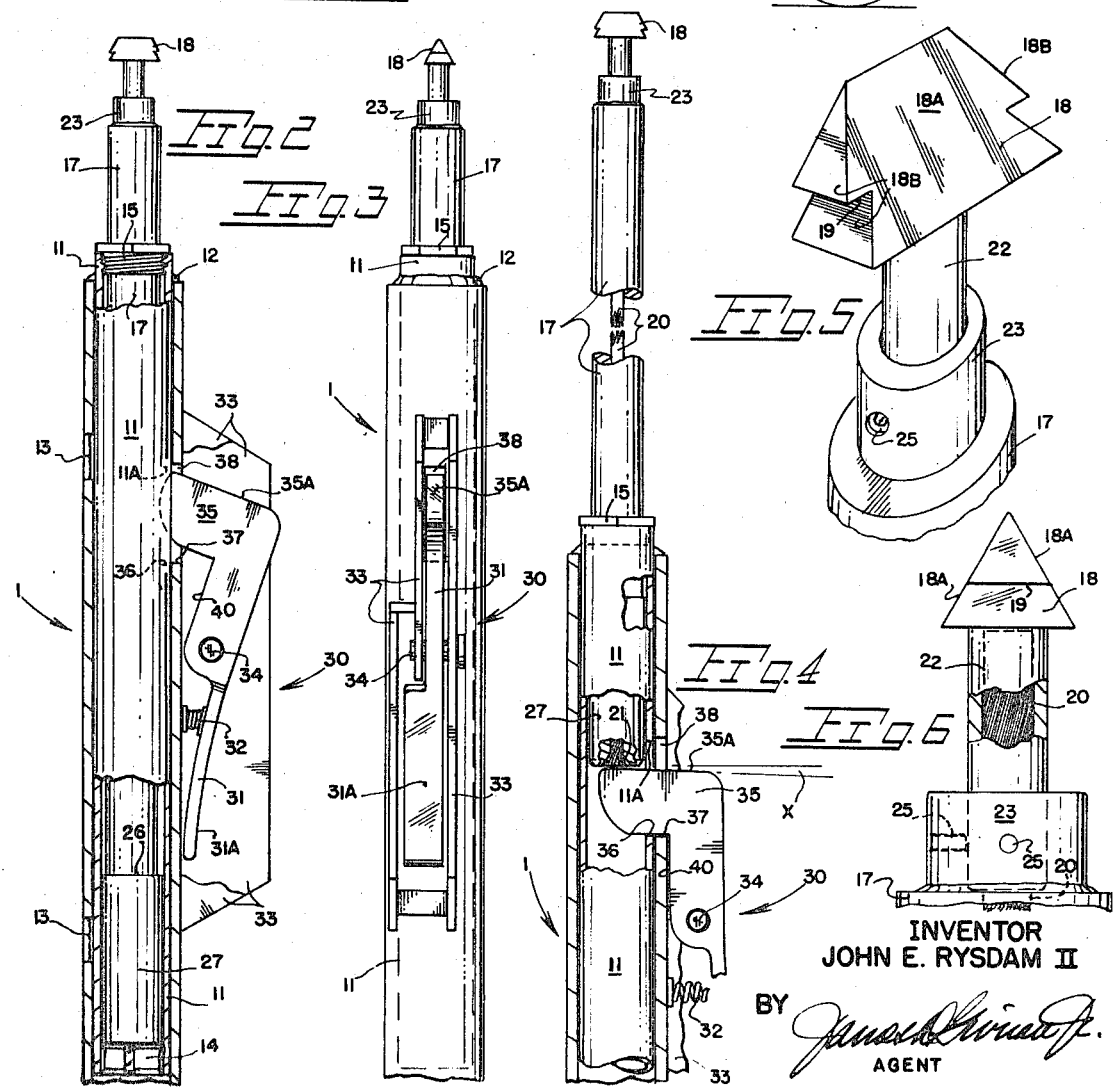
INVENTOR
JOHN E. RYSDAM II
BY
AGENT

3,712,639

EXTENSIBLE BUNK STAKE FOR LOG TRUCKS

BACKGROUND OF THE INVENTION

The present invention relates generally to log bunk stakes carried in an upright manner at the sides of a log truck and trailer and more particularly to a log bunk having an extension carried at its upper end for carrying higher than normal stacks of logs.

The prior art of which I am aware includes log bunk stakes adapted at their upper ends to receive an inserted extension to increase the usable height of the stake. Such extensions are manually inserted and removed from the hollow bunk stake.

In most log transporting operations the maximum gross weight for highway travel of the log truck and trailer is reached before the load of logs being transported is of a height equal to the height of a bunk stake. In the transporting of certain spruce and cedar species of logs a larger or higher load may be carried by reason of their weight being less than like sized logs of more common species. Further, in the transporting of relatively small diameter logs, such as in the logging of second growth timber, a relatively high load of logs may be carried before the gross weight limitation is reached due to the inherent lost space between the logs of a stack.

To remedy this problem truck operators have attempted various makeshift extension arrangements. Inserted extensions loosely in place in the bunk stake have been lost in transit as have extensions from their storage locations on the log truck. Obviously, lost extensions present a hazard to other motorists. Such extensions or parts thereof have become accidentally embedded in a log with disastrous consequences occurring to sawmill saws and related equipment. Tethering of such extensions by exposed cables has not been practical for the reason that a segment of looped cable adjacent the upper end of a bunk stake interferes with log loading and unloading. A further objection of presently known extensions is that their use necessitates both manual insertion and removal from the bunk stake end thus requiring the truck operator to climb upon each of the truck and trailer wheel assemblies with every load carried. This constitutes a hazard particularly in inclement weather to say nothing of the time lost which is critical in a fast paced log loading or unloading site.

SUMMARY OF THE INVENTION

The present bunk stake embodies a positionable extension carried in its retracted position within a guide housed within the bunk stake. The extension when extracted and locked in place permits the log truck and trailer to carry a higher than normal stack of logs when called for. When not required the truck operator may actuate a latch mechanism to retract the extension for secure retention thereof within the bunk stake. The extension is removably mounted for servicing purposes.

Accordingly, it is an important object of the present invention to provide a log bunk stake which is readily extendable to permit the truck and trailer to carry the maximum gross weight permitted. As most log truck operators are compensated by the weight of logs carried it is economically important that the truck operator carry a full load of logs on each trip. Existing extensions of the prior art, above described, do not permit readily converting the log truck and trailer to the carrying of higher than normal loads.

A further important object of the invention is to provide a bunk stake extension momentarily engageable at its upper end with a log being loaded with subsequent lifting of the log causing extraction and locking of the extension in place. The truck operator is not required to climb upon the wheels of the truck and trailer and manually position the extensions. Such manual extension is both hazardous and time consuming. In normal log truck loading time spent at the loading, unloading site is critical. The upper end of the extension is adapted to penetrate the bark of a log being loaded thereby permitting the operator of the log loading mechanism to quickly raise the extensions.

A further object of the invention is to provide a bunk stake extension securely retained against inadvertent extraction and loss from the bunk stake end. The stake carries a latch mechanism to bias the extension against one wall of the stake to retain the extension securely in place against vibrational movement. When extracted the latch mechanism serves to support the extension in a positive manner against loads encountered by the extension. Accidental loss or separation of any part of the extension is prevented by cable means extending substantially the length of the extension and secured at its ends to the extension.

A further object is the provision of means permitting the convenient interchange or replacement of the log engaging upper end of the extension.

BRIEF DESCRIPTION OF THE DRAWING

In the accompanying drawing:

FIG. 1 is a side elevational view of a log carrying truck and trailer with the logs being shown in phantom lines, FIG. 2 is a side elevational view of the upper portion of a bunk stake embodying the present invention with the extension retracted, FIG. 3 is a view similar to FIG. 1 but with the bunk stake turned through 90°, FIG. 4 is a side elevational view of the upper end of the bunk stake similar to FIG. 1 with the extension shown locked in an extended position, FIG. 5 is a perspective view of the upper end of an extension, and FIG. 6 is an elevational view, with fragments removed, of the interchangeable pointed member of an extension.

DESCRIPTION OF PREFERRED EMBODIMENTS

With continuing reference to the accompanying drawing wherein applied reference numerals indicate parts similarly identified in the following specification, the reference numeral 1 indicates generally a log bunk stake within which the present invention is embodied.

Typically log bunk stakes are located at the ends of horizontal log bunks at 2 which are located crosswise of the centerline of a log truck and trailer at 3 and 4. The log bunks at 2 are shown mounted in the usual manner on turntables 5 which allow for movement of the log load relative to the truck and trailer during turning of the latter. Tripping cables at 6 are releasable to permit downward swinging of the bunk stakes about their pivoted attachment with their log bunks for log unloading purposes. The log truck trailer includes a hollow reach member 7 within which is housed a rear end of a reach member 8 of the truck tractor. The reaches are interlocked during log loading by an adjustable clamp 10 all of which may be considered conventional in log truck and trailer construction.

The present invention resides in the upper portion of the bunk stake structure which are characteristically of hollow construction and usually rectangular in section. A tubular guide 11 is closely inset within the bunk stake and therein permanently secured by an annular weld 12 with the upper end of the guide projecting somewhat above the bunk stake end. The guide may be further secured in place by additional welds as at 13. With attention to FIG. 2 the lower terminus of the guide is fitted with limit stops 14 while at its upper end a threaded collar 15 serves as a removable limit stop. An elongate opening 11A formed in the wall of the guide permits passage of a latch component as later described.

Slidably housed within the guide 11 is an extension 17 terminating upwardly in log engaging means including a pointed member 18. Extending the length of the extension is a cable segment 20 constituting retention means which is secured at its lower end at 21 as by brazing, to the lower end of the extension. The pointed member 18 includes an integral shank 22 bored at 22A to receive the upper end of the cable in a swaged fit. Retention of the pointed member is further provided for by a holder 23 secured in place by a continuous weld to the upper end of the extension 17. The holder defines a socket 23A within which the lower end of the shank is inserted and locked in the holder by set screws 25. While a cable segment 20 is shown and described it will be apparent that the invention is not limited to the specific cable retention shown for the pointed member. The cable retention arrangement does enable convenient replacement of the pointed member upon removal of the set screws 25 and removal of the brazing at the lower end of the extension. Hence should damage or wear cause the replacing of pointed member 18 such is readily provided for.

For positive engagement the pointed member 18 is provided with a log insertable point with downwardly diverging surfaces as at 18A. Additional inclined surfaces at 18B, undercut at 19, serve to assure desired log engagement as later elaborated upon.

Cooperating with the threaded collar 15 to provide an upward limit stop for the extension is an annular shoulder 26 formed on the extension and defining the upper end of an enlarged 27 diameter of the extension. The extension at its larger diameter is in close sliding fit with its tubular guide 11 while the reduced length of the extension is in a like fit with the internal diameter of the threaded collar 15. Removal of the collar permits extension removal for servicing purposes.

A latch mechanism is indicated generally at 30 having a latch member 31 spring biased at 32 into a locking position as seen in FIG. 4. Guard plates 33 for the latch 31 are welded along their innermost edges to the bunk stake with one of the plates 33 being of irregular shape as seen in FIG. 3 to provide a support for a pivot pin 34. An enlarged area 31A of the latch constitutes a finger receiving area for depressing that part of the latch.

The upper end at 35 of the latch member is of right angular shape for operative movement into and out of the tubular guide to thereat support the extension in its raised position. Preferably the supporting surface 35A of latch member is, when operatively disposed, inclined 2° or so at X to exert an inward drawing action on same when the extension is resting thereon. The latch member extends inwardly to locate its inward end adjacent the opposite wall of the guide. Downward loads on the latch member are transferred to the guide member and the bunk stake by reason of the underside edge of the latch coming into rested contact with corresponding edges at 36 and 37 of aligned openings in the extension guide and bunk stake. The latter opening is indicated at 38. An upright surface 40 of the latch additionally engages the exterior of the bunk stake to impart loads thereto.

The spring at 32 biases the lower end of the latch outwardly about the axis of the pivot pin 34. To gravitationally retract the extension 17 the truck operator needs only to momentarily press the latch member to extract its upper end from the interior of the tubular guide 11 for the extension. Thereafter the latch is in biased contact with the extension as seen in FIG. 2.

In operation, and with attention to FIG. 1, wherein a log loading operation is depicted, the loading operator will load the logs in the usual manner. Loading may be by a mechanized log loader such as a tong equipped lift truck according precise control of each log during loading. Should it be necessary to lift the extensions into place to permit a full weight load to be carried, the loading operator simply lowers a log into engagement with the pointed end member 18 of an extension and thereafter lifts the log to extend the extensions. Upon the extensions reaching their maximum height (shoulder-contacting the threaded sleeve 15) the continued lifting of the log results in the ends pulling free of same. This is repeated for the remaining pair of extensions on the opposite side of the truck. Retraction of the extensions after unloading simply requires the truck operator to press the latches causing the extensions to fall into the retracted position. In most instances this may be accomplished without climbing upon the truck or wheel assemblies which, as earlier pointed out, is hazardous.

It will be obvious that the shape of the pointed end member of the extension may be varied in shape to effect the desired engagement with log. Damage to the log is insignificant as penetration of the wood, if at all, is minimal.

While I have shown but one embodiment of the invention it will be apparent to those skilled in the art that the invention may be embodied still otherwise without departing from the spirit and scope of the invention.

Having thus described the invention what is desired to be secured under a Letters Patent is:

I claim:

1. In combination with a log bunk stake of the type used on a log truck and trailer for confining a log load, the improvement comprising, an extension slidably carried within the upper end of the upright bunk stake and extensible therefrom into a raised extended position with such a position providing an increased log carrying capability of the truck and trailer, log engaging means disposed at the upper end of the extension, elongate retention means in attachment at one of its ends with said extension and with said log engaging means at the other of its ends to prevent loss of the latter upon separation from the extension, latching means for supporting engagement with the raised extension to retain same in an extended position, said latching means positionable out of supporting engagement with the extension to permit gravitational retraction of the extension to an unused position, and a tubular guide interposed between the walls of the bunk stake and the extension, said latching means including a latch member positionable into the tubular guide to support the bottom end of the raised extension, the extension supporting surface of said latch member being downwardly inclined so as to exert an inward drawing action on the latch member resulting from a downwardly exerted load of the extension on the latch member.

2. The improvement as claimed in claim 1 wherein said latch member is pivotally mounted upon the bunk stake with the latch member including an edge surface contactable with the bunk stake for transfer of extension loading thereto.

3. The improvement as claimed in claim 1 wherein said log engaging means includes a member having an upwardly disposed pointed edge adapted for log penetration permitting raising of the extension by lifting of a log in temporary engagement with the pointed member.

* * * * *